United States Patent
Tsuzuki et al.

(10) Patent No.: US 6,185,933 B1
(45) Date of Patent: Feb. 13, 2001

(54) EXHAUST EMISSION CONTROL DEVICE FOR ENGINE

(75) Inventors: Mikio Tsuzuki, Tokyo; Ritsuo Sato; Kimiyoshi Nishizawa, both of Yokohama, all of (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/333,026

(22) Filed: Jun. 15, 1999

(30) Foreign Application Priority Data

Jun. 15, 1998 (JP) .................................................. 10-167249

(51) Int. Cl.[7] ........................................................ F01N 3/00
(52) U.S. Cl. ............................... 60/285; 60/286; 60/295; 60/297; 60/311
(58) Field of Search ........................... 60/285, 286, 295, 60/297, 311

(56) References Cited

U.S. PATENT DOCUMENTS

| | | | |
|---|---|---|---|
| 5,315,824 | * 5/1994 | Takeshima | 60/297 |
| 5,355,672 | * 10/1994 | Adamczyk, Jr. et al. | 60/285 |
| 5,662,869 | * 9/1997 | Abe et al. | 60/285 |
| 5,778,667 | * 7/1998 | Kinugasa et al. | 60/286 |
| 5,887,422 | * 3/1999 | Abe et al. | 60/297 |
| 6,047,544 | * 4/2000 | Yamamoto et al. | 60/285 |

FOREIGN PATENT DOCUMENTS

| | | |
|---|---|---|
| 5-10178 | 1/1993 | (JP) . |
| 6-81637 | 3/1994 | (JP) . |
| 7-144119 | 6/1995 | (JP) . |

* cited by examiner

Primary Examiner—Thomas Denion
Assistant Examiner—Tu M. Nguyen
(74) Attorney, Agent, or Firm—Foley & Lardner

(57) ABSTRACT

A three-way catalyst (9) which has an oxygen storage capacity is disposed in an exhaust passage (3) and HC adsorbent-catalysts (10, 11) which can adsorb and oxidize HC are disposed further downstream. If release of HC from the HC adsorbent-catalysts is determined, the lean level of an air-fuel ratio is increased temporarily after HC release is commenced. Thereafter the air-fuel ratio is controlled to a lower lean level which corresponds to an HC concentration during release. In this way, after lean control is commenced, the three-way catalyst is saturated in a short time and oxygen is sent to the HC adsorbent-catalysts (10, 11) and released HC is oxidized.

10 Claims, 8 Drawing Sheets

Catalyst temperature estimation routine

EXHAUST EMISSION CONTROL DEVICE FOR ENGINE

FIELD OF THE INVENTION

The present invention relates to an emission control device provided with a catalyst which purifies exhaust gas emissions from an engine.

BACKGROUND OF THE INVENTION

In Japanese Patent Publication Tokkai-Hei-7-144119, a three-way catalyst and a hydrocarbon (hereafter HC) catalyst are disposed in series in an exhaust passage. The HC trap catalyst is disposed downstream of the three-way catalyst.

In a cold operating condition, that is to say, in a condition in which the three-way catalyst is not activated, HC discharge from the engine is trapped in the HC trap catalyst.

After the temperature of the HC trap catalyst reaches a release temperature, the HC trap catalyst begins releasting HC. Released HC is oxidized in the HC trap catalyst.

In Japanese Patent Publication Tokkai-Hei-6-81637 and Tokkai-Hei-5-10178, and HC trapper and a three-way catalyst are disposed in an exhaust passage. HC released from the HC trapper is oxidized in the three-way catalyst disposed downstream of the HC trapper.

While the HC trapper is releasing HC, a control unit for controlling the operation condition of the engine controls an air-fuel ratio to a lean air-fuel ratio so that the exhaust gas flowing into the three-way catalyst creates an oxidizing atmosphere.

In order to accuately control the lean air-fuel ratio with respect to the amount of released HC, in the device disclosed in Tokkai-Hei-6-81637, the control unit controls the lean level according to the duration of the HC release.

In the device disclosed in Tokkai-Hei-5-10178, an oxygen concentration sensor is disposed downstream of the three-way catalyst and the lean level is controlled according to the oxygen concentration that is detected by the sensor.

SUMMARY OF THE INVENTION

An emmission control device having a catalyst which is disposed in an exhaust passage near combustion chambers of an engine can reduce the amount of HC emissions, because the catalyst disposed near engine activates in short time after engine start.

In order to increase emission control performance, if it is necessary for the device to have both of a start-up catalyst which activates in short time after engine start and a HC adsorbent catalyst, the HC adsorbent catalyst must be disposed at downstream of the start-up catalyst. In this case, even if the air-fuel ratio is varied towards a lean air-fuel ratio together with the release of HC from the HC adsorbent catalyst, the oxygen storage capacity of the upstream three-way catalyst functions so that oxygen in the exhaust gas does not immediately reach the downstream HC adsorbent catalyst. Oxygen is stored by three-way catalyst. Therefore only after saturation by the oxygen which is stored in the three-way catalyst, that is to say, after a time delay, remaining oxygen reaches the HC adsorbent catalyst.

Thus HC released during this period is not oxidized by the HC adsorbent catalyst and is released directly into the atmosphere.

The present invention is proposed to solve the above problems and has the object of providing an emission control device which is adapted to commence oxidization of released HC in the shortest possible time after HC release has commenced in the HC adsorbent catalyst.

Another object of the present invention is to reduce the level and time of application of the lean air-fuel ratio to the necessary minimum to oxidize released HC and thus to minimize adverse effects on vehicle performance as a result of operating on a lean air-fuel ratio.

In order to achieve above objects the present invention provides an emission control device for an engine.

The engine comprises a catalyst disposed in an exhaust passage, the catalyst storing oxygen, a hydrocarbon adsorbent-catalyst disposed in the exhaust passage at a location downstream of the catalyst, and a control unit that controls air-fuel ration of the engine. The control unit is programmed to determine release of hydrocarbons from the hydrocarbon adsorbent-catalyst based on a catalyst temperature, to control the air-fuel ratio to a first lean air-fuel ratio when the hydrocarbon adsorbent-catalyst starts to release hydrocarbons, and to control an air-fuel ratio to a second lean air-fuel ratio after controlling to the first lean air-fuel ratio during hydrocarbon release by the hydrocarbon adsorbent-catalyst; the first lean air-fuel ratio being leaner than the second lean air-fuel ratio.

The details as well as other features and advantages of the invention are set forth in the remainder of the specification and are shown in the accompanying drawings.

DESCRIPTION OF THE PREFERRED EMBODIMENTS

The preferred embodiments will be explained below with reference to the accompanying drawings.

Figure 1:
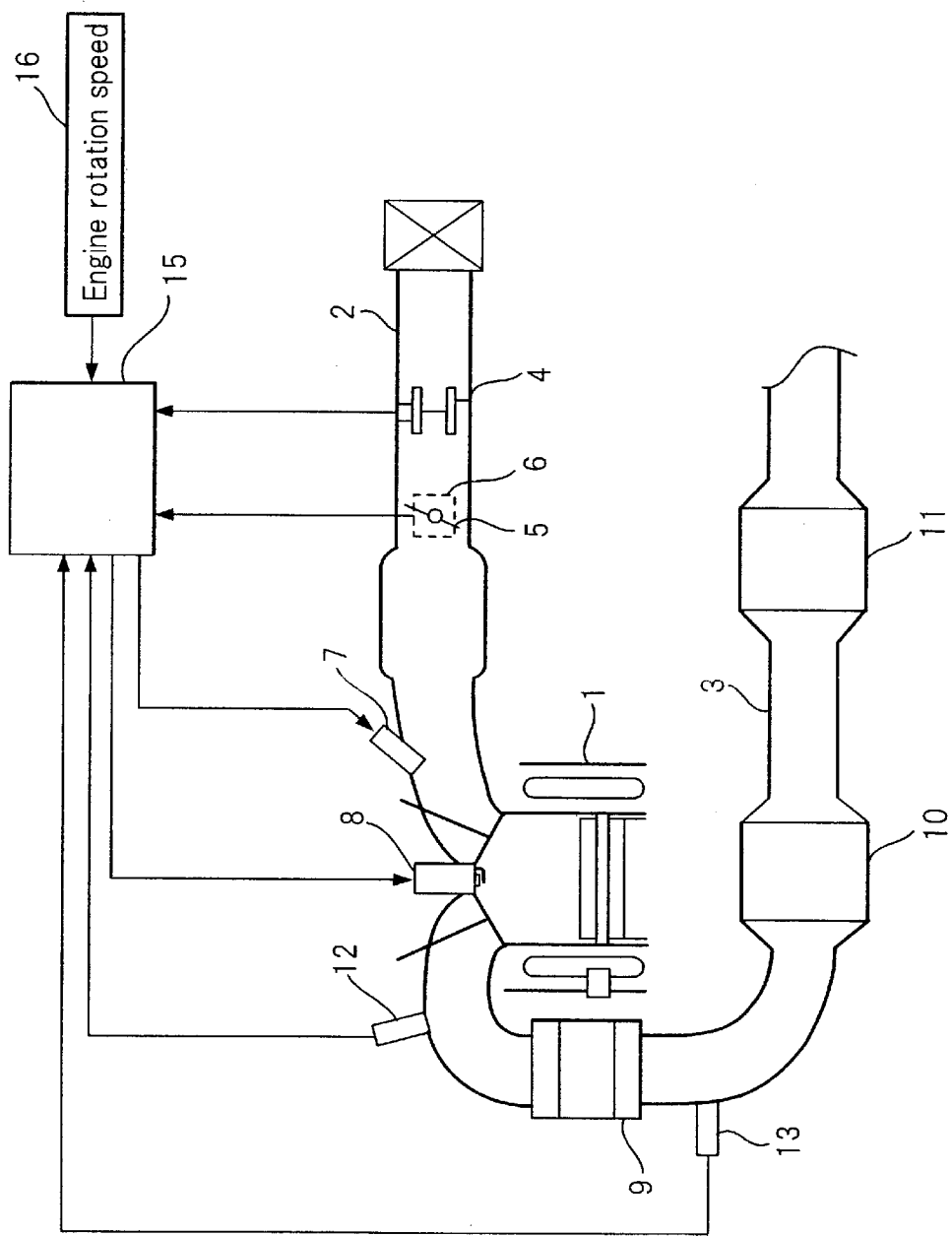
FIG. 1 is a schematic view of an embodiment of the present invention.

With reference to FIG. 1, reference numeral 1 denotes an internal combustion engine, 2 is an air intake passage, and 3 is an exhaust passage. 4 is an airflow meter disposed in the intake passage 2, 5 is a throttle valve and 6 is a throttle aperture sensor which detects the aperture of the throttle valve 5. 7 is a fuel injection valve which supplies fule to the intake passage 2 and 8 is an ignition plug.

A three-way catalyst 9 is disposed in the exhaust passage 3. The three-way catalyst 9 includes precious metal, performs oxidation of HC and carbon monoxide (CO), and reduction of nitrogen oxides (NOx) at the same time at the stoichiometric air-fuel ratio.

HC adsorbent-catalyst 10 and 11 are disposed is series in the exhaust passage 3 at a location downstream of the three-way catalyst 9. HC adsorbent-catalyst 10 and 11 include HC adsorbent like zeolite and catalyst having precious metal. The HC adsorbent of the HC adsorbent-catalyst 10 and 11 has the capability to adsorb HC at a lower temperature, and to release HC at a higher temperature. The catalyst in HC adsorbent-catalyst 10 performs oxidation of HC when the air-fuel ratio in the HC adsorbent-catalyst 10 is being stoichiometoric or lean and the temperature of the HC adsorbent-catalyst exceeds the certain temperature. Also, the catalyst in HC adsorbent-catalyst 11 performs oxidation of HC when the air-fuel ratio in the HC adsorbent-catalyst 11 is being stoichiometric or lean and the temperature of the HC adsorbent-catalyst exceeds the certain temperature.

The three-way catalyst 9 and the catalyst in HC adsorbent-catalyst 10, 11 store oxygen at the lean air-fuel ratio, and stored oxygen is consumed at the rich air-fuel respectively.

Two HC adsorbent catalysts 10, 11 are provided in order to increase emission control performance. Even when a part of HC released from the upstream HC adsorbent catalyst 10 is not oxidized with in the same HC adsorbent catalyst 10 and flows downstream, it is readsorbed by the downstream HC adsorbent catalyst 11 which is lower temperature than the upstream HC adsorbent catalyst 10. Thus it is possible to accurately reduce the amount of exhaust emissions into the outer atmosphere by a degree. However although the number of HC adsorbent catalyst devices may be increased as necessary, needless to say, the devices may also be reduced.

12 is a linear air-fuel sensor which is disposed upstream of the three-way catalyst 9. 13 is an oxygen sensor (or linear air-fuel sensor) which is disposed downstream.

15 is a controller which controls an air-fuel ratio or an ignition timing based on an intake air amount signal from the airflow meter 4, an engine rotation speed signal from a rotation speed sensor 16, an exhaust air-fuel ratio signal from the air-fuel sensor 12, 13, and a throttle aperture signal from the throttle aperture sensor 6.

In particular the controller 15 determines a release period for HC adsorbed by the HC adsorbent catalyst 10, 11 by estimating exhaust gas temperature and during release controls an air-fuel ratio to a lean level in response to the amount of HC released to perform oxidization of HC.

In this case, in response to the remaining oxygen storage capacity in the three-way catalyst 9, the lean level at the initiation of lean air-fuel control is increased, the oxygen storage amount of the three-way catalyst 9 is quickly saturated, and oxygen reaches the upstream HC adsorbent catalyst 10, in an extremely short period of time after the commencement of lean control. Then, in response to the remaining oxygen storage capacity in the three-way catalyst and the upstream HC adsorbent-catalyst 10, the lean level at the initiation of lean air-fuel control is increased, the oxygen reaches the downstream HC adsorbent-catalyst 11 in an extremely short period of time after the commencement of lean control.

The control of the lean air-fuel ratio will be disclosed in detail with reference to the flowcharts in FIG. 2 to FIG. 7.

The content of the flowcharts is repeated in a fixed unit time.

Figure 2:
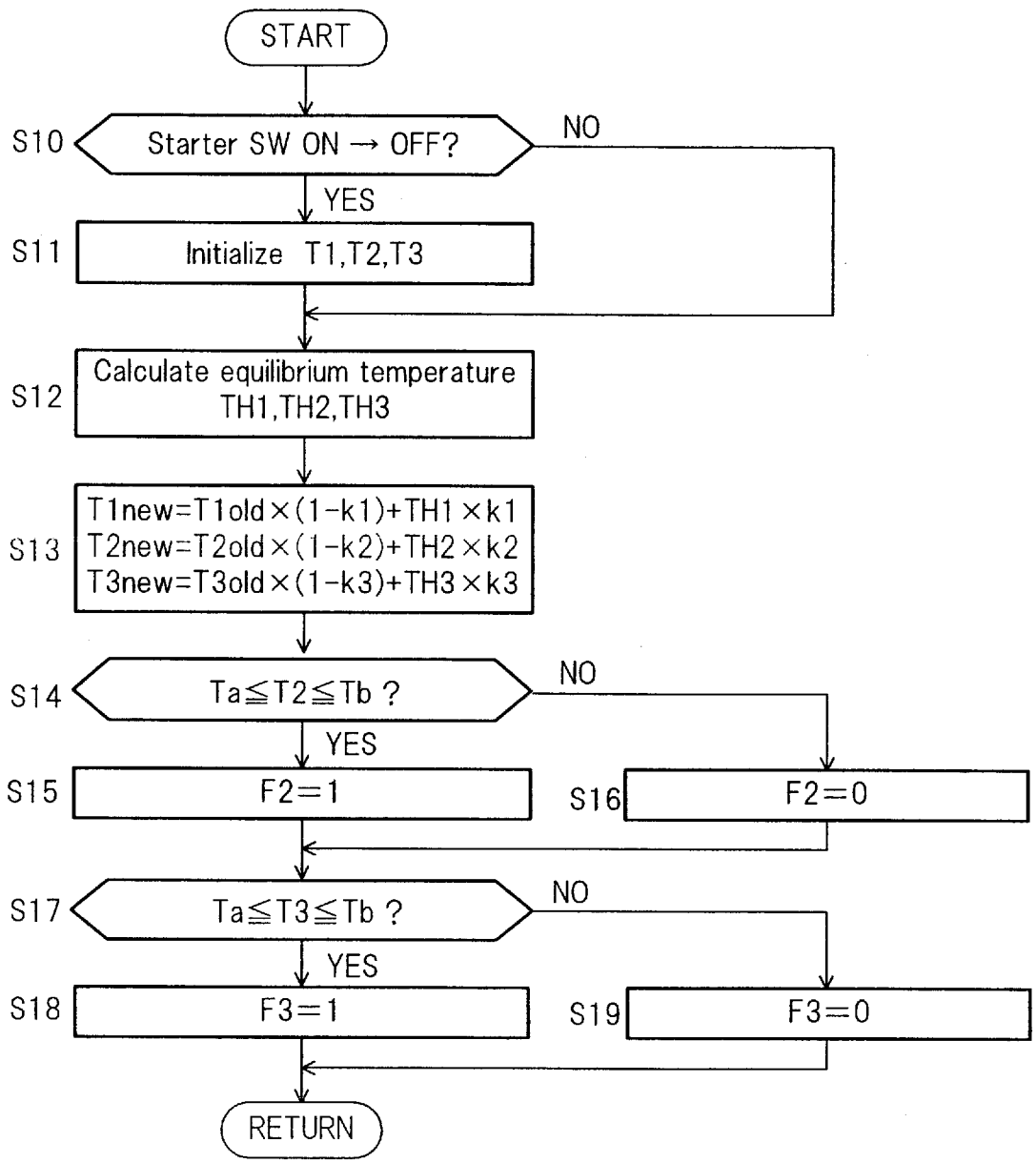
FIG. 2 is a flowchart showing the estimation operation of the temperature of the catalyst.

Firstly FIG. 2 shows a routine for estimating a temperature of the catalyst 9, 10, 11. In a step S10, it is determined that the engine is starting from the variation in starter SW from the ON position to the OFF position. When the engine start is detected, in a step S11, T1–T3 are set with initial values representing estimated temperature values for each catalyst based on the temperature of the engine coolant or the like.

T1 is the estimated temperature value for the uppermost upstream three-way catalyst 9, T2 is an estimated temperature value for the upstream HC adsorbent catalyst 10, T3 is an estimated temperature value for the downstream HC adsorbent catalyst 11.

In a step S12, temperatures Th1, TH2, TH3 when each catalyst is in a state of balance are calculated based on operational conditions (such as engine rotation speed, engine fuel pulse width corresponding to load).

In a step S13, the temperature of each catalyst is estimated as catalyst temperature T1, T2, T3 as approximations to a linear delay from the above balanced temperatures occurring over time after engine start based on linear delay constants K1, K2, K3. That is to say, T1 new=T1 old×(1−K1)+TH1×K1

T2 new=T2 old×(1−K2)+TH2×K2

T3 new=T3 old×(1−K3)+TH3×K3

In a step S14, on the basis of each temperature calculated as above, firstly it is determined whether or not the upstream HC adsorbent catalyst 10 is releasing HC based on a comparison of an initial release temperature Ta and a final release temperature Tb of the catalyst temperature T2. If catalyst temperature T2 is in such a temperature range, releasing HC is determined in a step S15, a flag F2 which shows current HC release is set as F2=1. If however no current HC release is determined, the flag F2 in a step S16 is reset to the value 0.

In steps 17–19, in the same way, it is determined whether or not the downstream HC adsorbent catalyst 11 is releasing HC based on a catalyst temperature T3. If the catalyst is determined to be releasing HC a flag F3 is set, if no release is determined, the flag F3 is reset.

A catalyst temperature may be directly detected by a temperature sensor.

Figure 3:
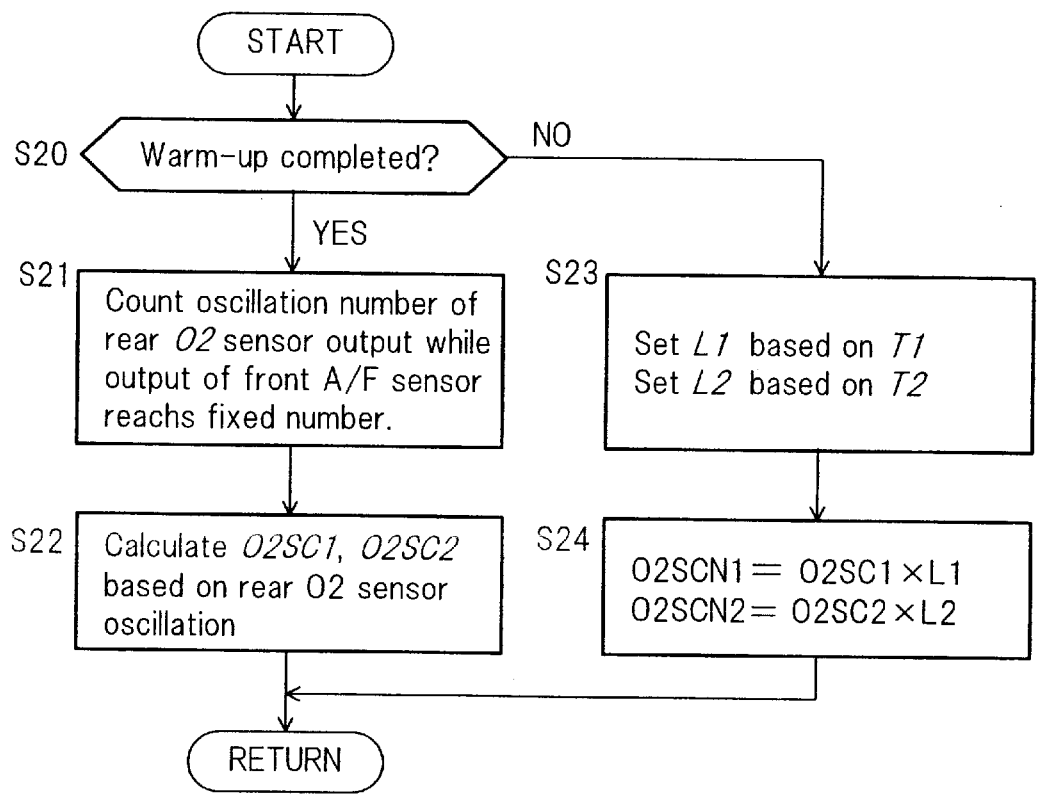
FIG. 3 is a flowchart showing the calculation operation of the oxygen storage capacity.

FIG. 3 is a routine calculating an oxygen storage capacity of a catalyst.

In a step S20, it is determined whether or not warm-up has been completed from the temperature of the engine coolant temperature or the like. If warm-up has been completed, a determination of the degree of deterioration of the uppermost upstream three-way catalyst 9 is performed in steps S21, S22. The oxygen storage capacity varies resulting of the degree of deterioration.

While the output of the upstream catalyst linear air-fuel sensor (from A/F sensor) oscillates a fixed number of times, the number of oscillations of the output of the downstream oxygen sensor (rear O2 sensor) is counted. The level of deterioration is determined based on the number of oscillations of the downstream oxygen sensor. O2SC1 and O2SC2, which are the oxygen storage capacities of the three-way catalyst 9 and upstream HC adsorbent catalyst 10, are calculated based on the determined level of deterioration.

Oxygen storage capacities are reduced as deterioration of the catalyst progresses, and the corresponding relationship of the oxygen concentration in the upstream and downstream catalysts varies. The O2SC1 and O2SC2 tables are referred to on the basis of the number of oscillations for example of the oxygen sensor output and a storage capacity is estimated. The progress of the deterioration of the three-way catalyst 9 and that of the HC adsorbent catalyst displays a fixed relationship under normal conditions. Thus if the level of deterioration of the three-way catalyst 9 is analyzed, it is possible to estimate the oxygen storage capacity of the HC adsorbent catalyst 10.

When engine warm-up is not completed, since the oxygen storage capacity of the catalyst is reduced, in a step S23, correction coefficients L1, L2 are set based on catalyst temperatures T1, T2 in a step S23 in order to correct the reduction component. The values L1, L2 are set between 0–100% depending on the temperature (absolute activity temperature being 100%).

The oxygen storage capacities O2SCN1 and O2SCN2 at the current time of the three-way catalyst 9 and the upstream HC adsorbent catalyst 10 are calculated in a step S24 in the following manner based on a correction coefficient. That is to say,

O2SCN1=O2SC1×L1

O2SCN2=O2SC2×L2

The oxygen storage capacities O2SC1 and O2SC2 of the three-way catalyst 9 and the upstream HC adsorbent catalyst 10 are stored in a memory after engine is stop.

Figure 4:
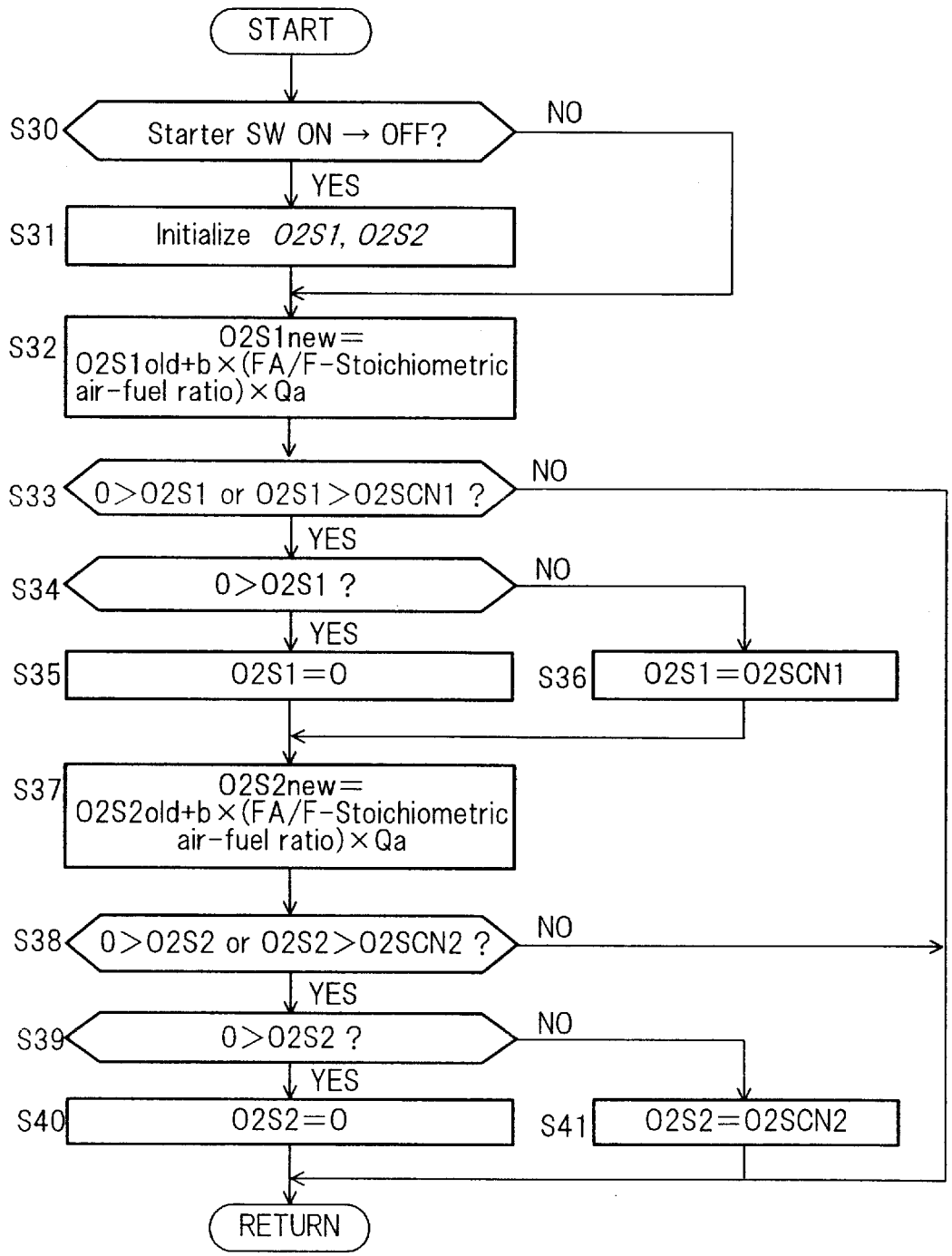
FIG. 4 is a flowchart showing the calculation operation of the oxygen storage amount.

FIG. 4 is a routine which calculates a current oxygen storage amount of the catalyst.

In a step S30, it is determined whether the engine is starting by whether or not the starter SW has been varied from the ON position to the OFF position. If the engine start is detected, in a step S31, O2S1 and O2S2 are set initial values for the oxygen storage amount of the three-way catalyst 9 and the upstream HC adsorbent catalyst 10.

In a step S32, a current oxygen storage amount is calculated.

The oxygen storage amount does not vary when the air-fuel ratio is stoichiometric, as oxygen is almost equivalent to reducing agents (HC, CO) in the exhaust gases. However the oxygen storage amount increases with lean air-fuel ratios and decreases with rich air-fuel ratios.

The amount of oxygen supplied to the catalyst and the amount of oxygen consumed at the catalyst by the reducing agents are calculated from the difference of the stoichiometric air-fuel ratio (SA/F) and the actual air-fuel ratio (FA/F) detected by the linear air-fuel ratio sensor and the air intake amount Qa at that time. Then the absolute value of the current oxygen storage amount O2S1 new is calculated from these values and the previous values:

O2S1 new=O2S1 old+b×(FA/F−SA/F)×Qa where b is a coefficient.

In a step S33, it is determined whether oxygen in the three-way catalyst 9 has been completely consumed or whether oxygen is overflowing from the catalyst. That is to say, if the calculated oxygen storage amount has a value less than zero, oxygen has been completely consumed. If however the calculated oxygen storage amount has a value above the capacity, it is determined that oxygen is overflowing from the catalyst.

If either condition is fulfilled, in a step S34, it is determined whether oxygen in the catalyst has been completely consumed or not. If oxygen has been completely consumed, in a step S35, the oxygen storage amount O2S1 of the three-way catalyst 9 is limited to 0.

If oxygen has not been completely consumed, since oxygen will be overflowing from the catalyst at this time, in a step S36, the oxygen storage amount O2S1 is limited to a current the oxygen storage capacity O2SCN1.

Then depending on the time when oxygen consumption in the three-way catalyst 9 is completed or when remaining oxygen is given off, the routine proceeds to a step S37, and a current oxygen storage amount O2S2 new of the upstream HC adsorbent catalyst 10 is calculated in the same way as the three-way catalyst 9 above.

That is to say, under the above conditions, the air-fuel ratio of the exhaust gas flowing into the upstream HC adsorbent catalyst 10 is assumed to be equal to an air-fuel ratio detected by said linear air-fuel ratio sensor 13.

When oxygen is completely consumed, the value of O2S2 is limited to 0, and when oxygen is overflows, the value is limited to the current storage capacity as O2S2=O2SCN2.

In the step S33 above, when oxygen consumption in the catalyst is not completed and however oxygen does not overflow, the air-fuel ratio of the exhaust gas entering the upstream HC adsorbent catalyst 10 takes a stoichiometric value and the amount of oxygen stored does not vary.

When a linear air-fuel sensor is used instead of an oxygen sensor, it is possible to calculate the oxygen storage amount of the upstream HC adsorbent catalyst 10 in the following manner independently of the calculation of the oxygen storage amount of the three-way catalyst 9.

O2S2 new=O2S2 old+b×(RA/F−SA/F)×Qa where RA/A is the output of the linear air-fuel ratio sensor disposed instead of the oxygen sensor.

Figure 5:
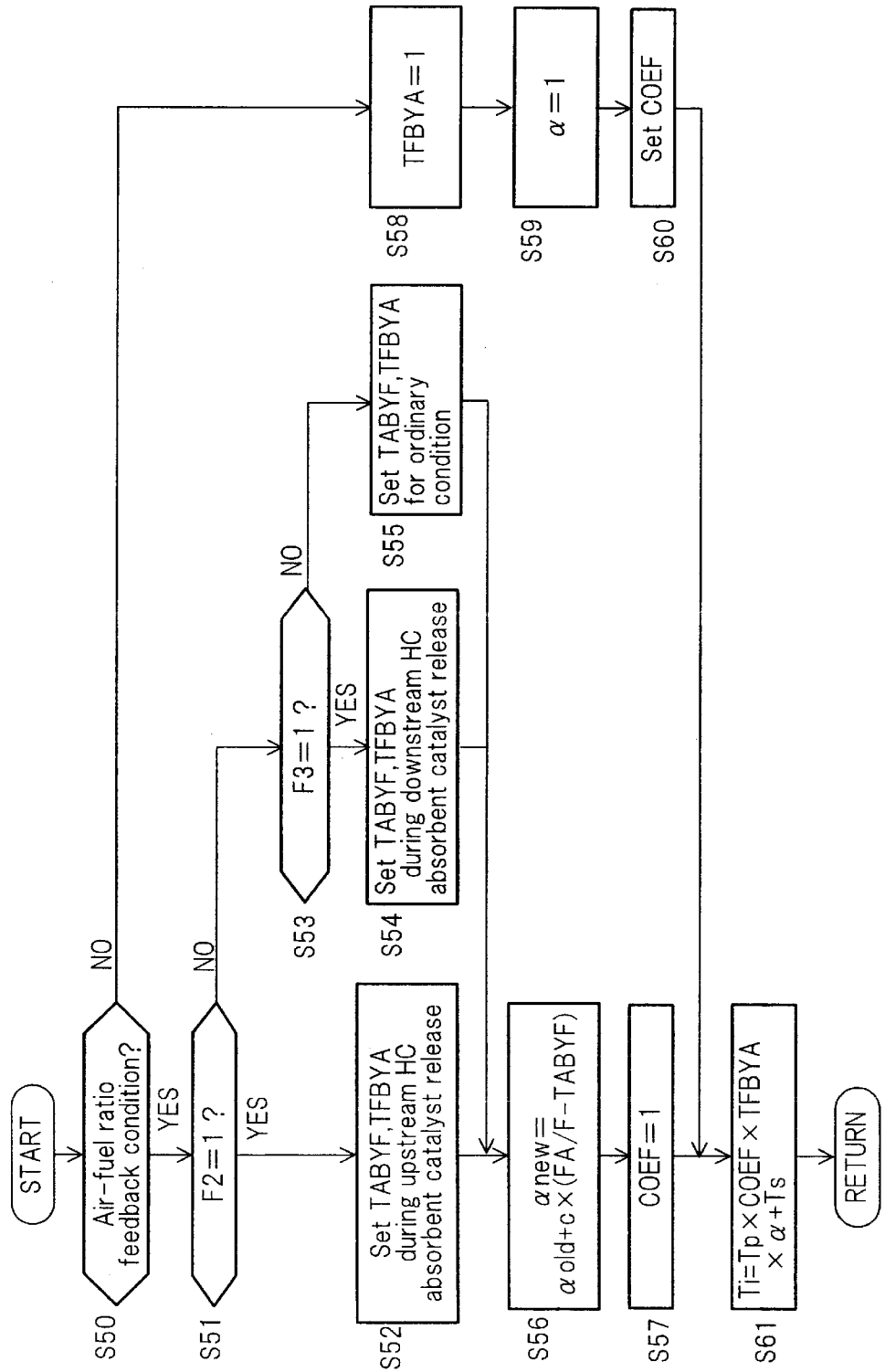
FIG. 5 is a flowchart showing the calculation operation of a fuel injection amount.

FIG. 5 is a routine to calculate a fuel injection amount.

In a step S50, when conditions such as the activity of the linear air-fuel ratio sensor being completed or the temperature of the engine coolant being above a fixed temperature are met, it is determined that air-fuel ratio feedback conditions are met. During feedback control, in a step S51, it is determined whether or not the upstream HC adsorbent catalyst 10 is releasing HC by the flag F2 taking value of 1 or not.

If HC is being released, the routine proceeds to a step S52, and an air-fuel ratio of the time when the upstream HC adsorbent catalyst 10 is releasing HC is set as shown in the routine in FIG. 6 which is discussed below.

Furthermore if the upstream HC absorbent catalyst 10 is not releasing HC, the routine progresses to a step S53 and it is determined whether or not the downstream HC adsorbent catalyst 11 is releasing HC based on whether the flag F3 has value 1 or not. If the downstream HC adsorbent catalyst 11 is releasing HC, the routine proceeds to a step S54 and an air-fuel ratio of the time when the downstream HC adsorbent catalyst 11 is releasing HC is set as shown in the routine in FIG. 7 discussed below.

If the downstream HC adsorbent catalyst 11 is not releasing HC, the routine proceeds to a step S55, and a target air-fuel ratio TABYF and a target equivalence ratio TFBYA for ordinary condition are calculated. A target air-fuel ratio TABYF is set based on current operating conditions, and a corresponding target equivalence ratio TFBYA is calculated based on the following equation. Here a target equivalence ratio TFBYA for high load operating regions takes value larger than 1 (TFBYA>1) to be controlled rich air-fuel ratio, and a target equivalence ratio TFBYA for other operationg regions takes a value equal 1 (TFBYA=1) to be controlled stoichiometric air-fuel ratio.

TFBYA=stoichiometric air-fuel ratio/TABYF

In a step S56, an air-fuel ratio feedback correction coefficient a is calculated as below based on the set value of the target air-fuel ratio in each case above:

a new=a old+c×(FA/F−TABYF)

In a step S57, a cramping is performed on correction coefficient COEF=1.

In the step S50, when feedback control is not being performed, the routine proceeds to steps 58–60 as activation time and post-activation time control steps. Firstly, a target equivalence ratio TFBYA is set to 1, a feedback correction coefficient a is set to 1 and correction coefficient COEF is set. COEF is sum of an incremental correction coefficient after engine start, a water temperature increase correction coefficient and the like.

In the step S61, on the basis of the above values, a fuel injection amount Ti is calculated as shown below.

$Ti = Tp \times COEF \times TFBYA \times a + Ts$

When Tp is a fuel injection pulse width based on a stoichiometric air-fuel ratio and Ts is an effective pulse width of the fuel injection valve.

Next the method of setting the lean air-fuel ratio when HC is released from the upstream HC adsorbent catalyst 10 shown will be explained in FIG. 6.

Since it is determined whether or not HC release has just commenced in the step S520, it is determined whether or not the flag F2 has just changed value from 0 to 1 or not. In a step S521, the counter CT is cleared in preparation for calculation of the continuous time for a lean spike which temporarily increases the lean level of air-fuel ratio which is executed immediately after the initiation of HC release.

In a step S522, a remaining oxygen storage capacity ΔO2S1 in the three-way catalyst 9 is calculated from the difference of the storage capacity and the current storage amount, that is to say, from ΔO2S1=O2SCN1−O2S1.

In a step S523, it is assumed that the current air intake amount does not change, and a value for the air-fuel ratio necessary for the lean spike which saturates the oxygen storage capacity of the three-way catalyst 9 in a short fixed time is calculated based on the remaining oxygen storage capacity. Then if the calculated lean air-fuel ratio value for the lean spike is allowable air-fuel ratio for engine performance, the calculated lean air-fuel ratio value is set to LEANa and the short fixed time is set to LEANTM.

On the other hand, when the calculated lean air-fuel ratio for lean spike is leaner than the allowable air-fuel ratio for engine performance, the allowable air-fuel ratio is set as LEANa and a continuous time for lean spike time necessary to saturate the oxygen storage capacity is calculated based on the remaining oxygen storage capacity and set as LEANTM.

In a step S524, the set lean air-fuel ratio LEANa is set as a target air-fuel ratio TABYF of the lean spike. From these values, a target equivalence ratio TFBYA is calculated as TFBYA=stoichiometric air-fuel ratio/LEANa.

In contrast, when it is determined in a step S520 it is not immediately after initiation of release, the routine progresses to a step S525 where the counter CT is counted at a size corresponding to the current air intake amount Qa. The increment in the count increase in proportion to the size of the current air intake amount Qa. In a step S526, it is determined whether or not the counter CT has elapsed the set time LEANTM.

When the counter CT has not elapsed the set time LEANTM, in a step S527, LEANa is set as a target air-fuel ratio TFBYF and the target equivalent ratio TFBYA is calculated.

In contrast, when the counter CT has elapsed the set time LEANTM, the routine proceeds to a step S528 and a lean air-fuel ratio LEANb which necessary to oxidize released HC is set. This is set to the lean level of the air-fuel ratio which corresponds to the concentration of released HC. In a step S529, this value is taken to be a target air-fuel ratio TABYF and on the basis of this value, the target equivalence ratio TFBYA is calculated as TFBYA=stoichiometric air-fuel ratio/LEANb.

In the above way, a lean air-fuel ratio, which is necessary for the upstream HC adsorbent catalyst 10 when HC is released, is set.

Figure 7:
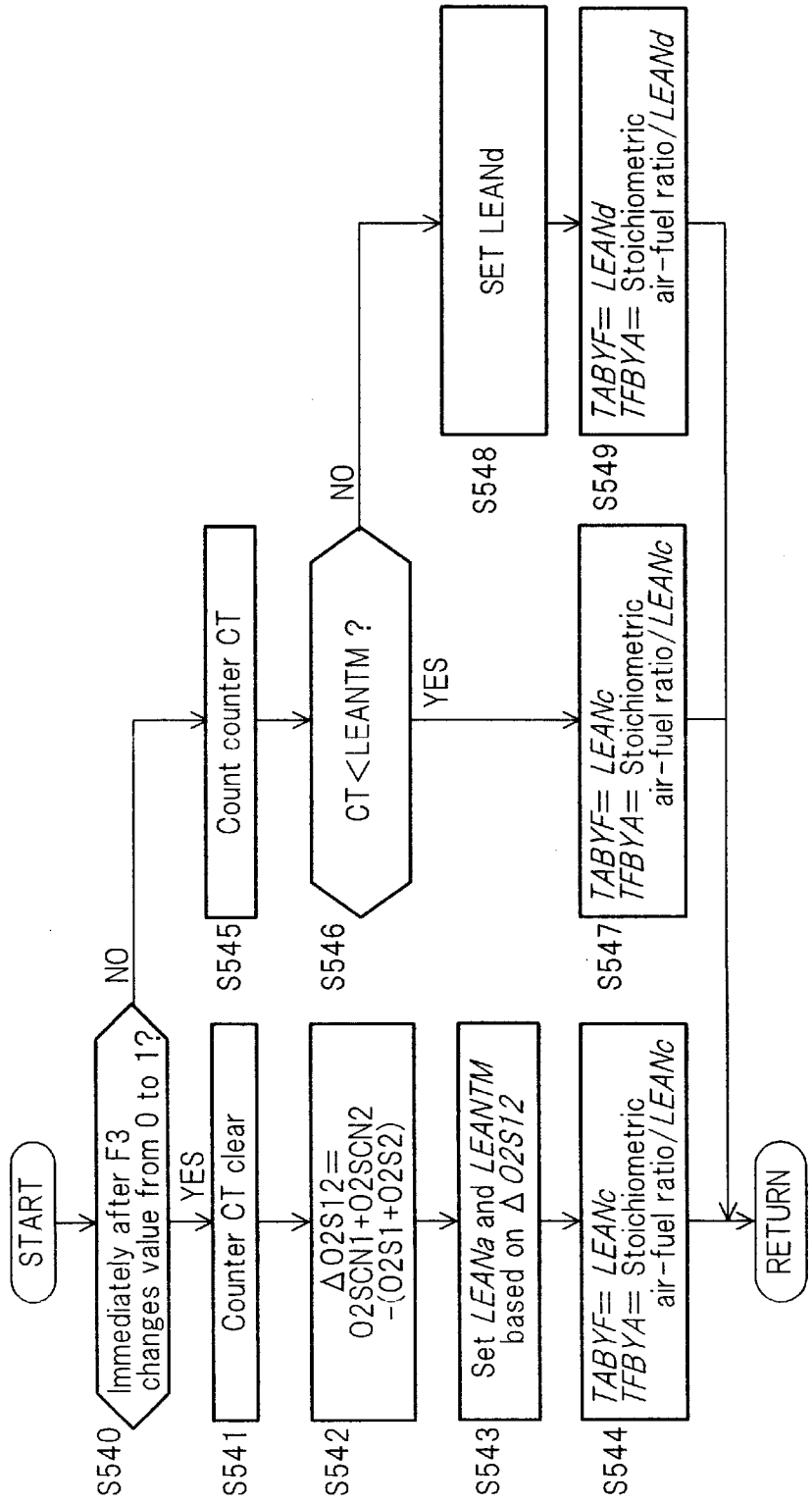
FIG. 7 is a flowchart showing the air-fuel ratio control operation during HC release downstream.

Next in FIG. 7, the setting routine of a lean air-fuel ratio when HC is released from the downstream HC adsorbent catalyst 11 will be explained.

Figure 6:
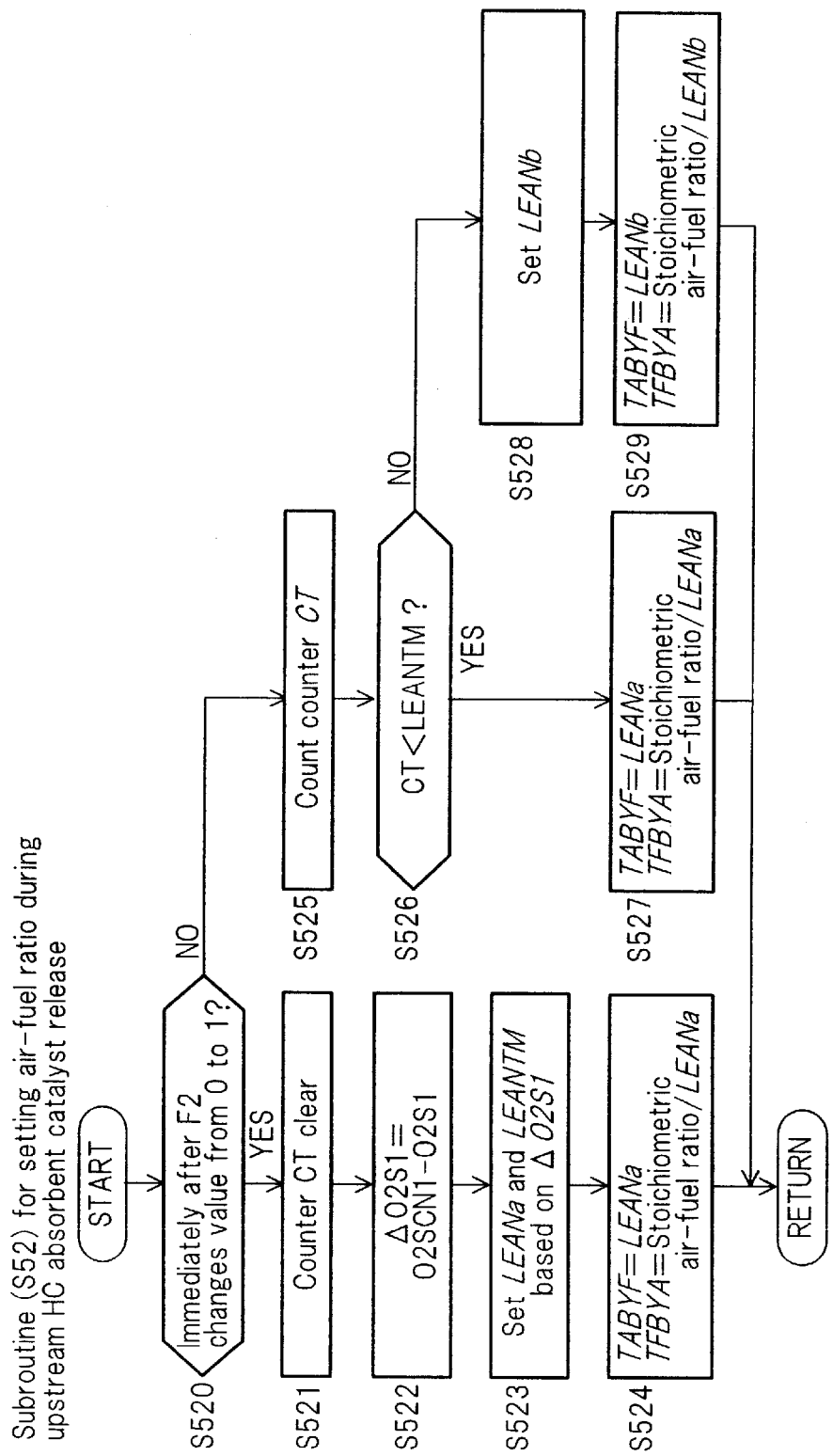
FIG. 6 is a flowchart showing the air-fuel ratio control operation during HC release upstream.

The setting air-fuel ratio when HC is released from the downstream HC adsorbent catalyst 11 is basically the same as the setting of the air-fuel ratio in FIG. 6 above. The remaining oxygen storage capacity ΔO2S12 of the entire upstream catalyst is calculated from the sum of the remaining oxygen storage capacity of both the three-way catalyst 9 and the upstream HC adsorbent catalyst 10.

That is to say, both current storage amounts are subtracted from both storage capacities and thus the ΔO2S12 is calculated. In other words, this becomes ΔO2S12=O2SCN1+O2SCN1−(O2S1+O2S2).

In this way remaining oxygen storage capacity ΔO2S12 is calculated and on this basis, the lean spike air-fuel ratio and continuous time are set. When the lean spike time has elapsed, the lean level of the lean air-fuel ratio during release is set corresponding to the HC release characteristics in the downstream HC adsorbent catalyst 11.

Figure 8:
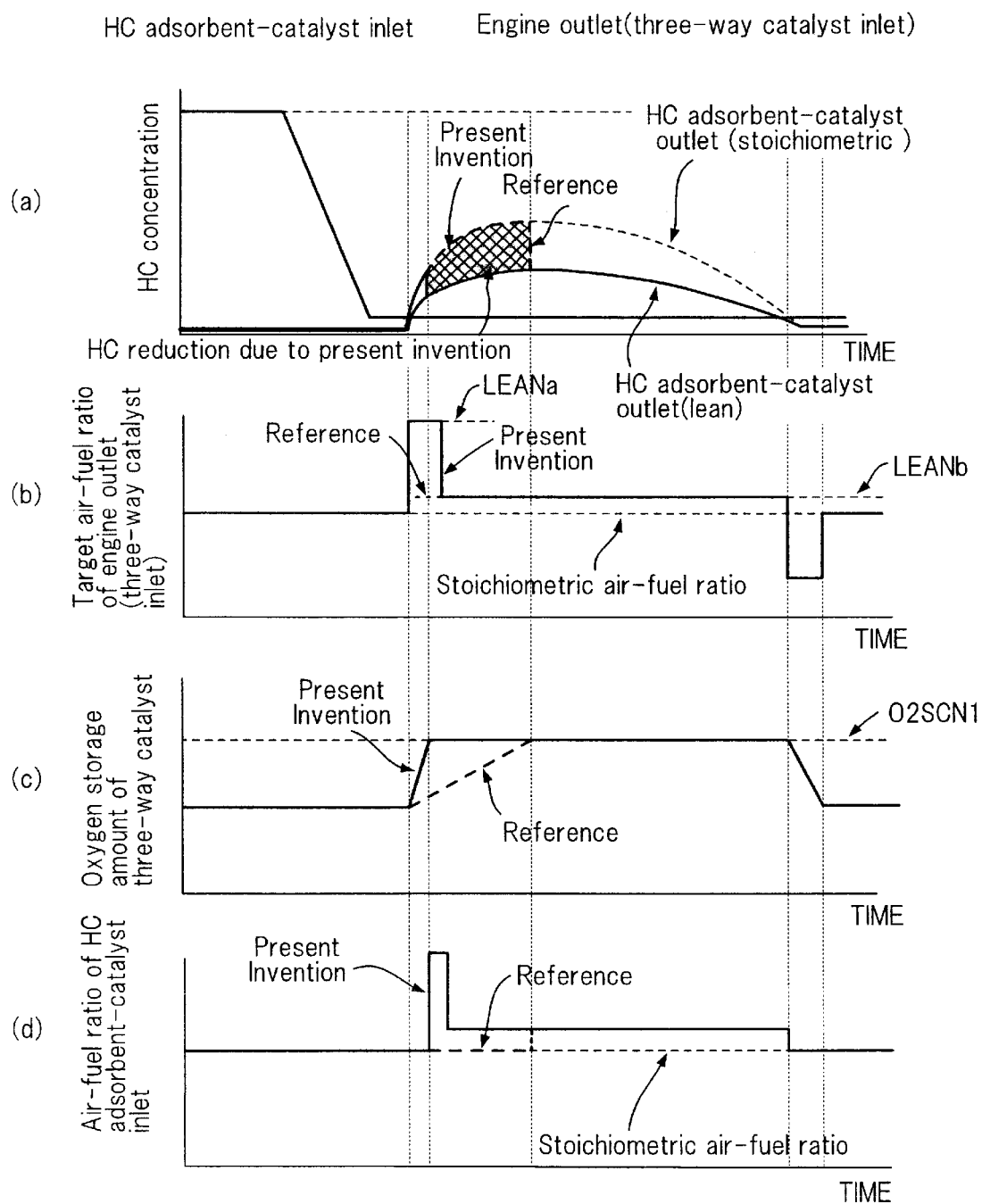
FIG. 8 (a)–(d) are an explanatory diagram showing the relationship between control of air-fuel ratio and characteristics of HC release.

The overall operation of the above arrangement will now be explained with reference to FIG. 8.

While the three-way catalyst 9 is not activate for example during cold engine operation, HC components of the exhaust gas are not oxidized by the three-way catalyst 9 and are flow downstream. However since HC adsorbent catalyst 10, 11 are disposed downstream, HC components are absorbed and prevented from being emitted into the atmosphere.

When the temperature of the exhaust gases increases and the temperature of the HC adsorbent catalysts 10, 11 reaches an HC release temperature, the HC adsorbent catalysts 10, 11 release the amount of HC adsorbed up until that point in time. When it is determined that HC released has commenced in the HC adsorbent catalysts 10, 11, the air-fuel ratio is switched to a lean air-fuel ratio from the stoichiometric air-fuel ratio in response.

Thus the oxygen concentration in exhaust emissions is increased and oxidization of released HC is performed by the oxidizing function of the HC adsorbent catalyst 10, 11.

However when the oxygen in exhaust gas as a result of a lean air-fuel ratio reaches the upstream three-way catalyst 9 and is stored due to remaining oxygen storage capacity in the catalyst at that time, the downstream oxygen concentration is not immediately increased. Thus released HC is not oxidized during that period and released directly into the atmosphere.

If the period after initiation of release until the arrival of oxygen is lengthened, HC emission control effectiveness is reduced to that extent.

In the present invention, when HC release is detected, for example, when the upstream HC adsorbent catalyst 10 commences HC release, an remaining oxygen storage capacity of the upstream three-way catalyst 9 is calculated at that time and a lean air-fuel ratio at a corresponding level, that is to say, a lean spike, is performed.

This lean spike differs from the lean level of air-fuel ratio which corresponds to the concentration of released HC and has the purpose of saturating the oxygen storage capacity of the three-way catalyst 9 in the short time. Thus a lean level of air-fuel ratio necessary for the lean spike and the corresponding continuous time is set depending on the remaining oxygen storage capacity of the three-way catalyst 9.

As a result, after the commencement of lean control, the oxygen storage amount of the three-way catalyst 9 reaches saturation in an extremely short time. Thus as is clear from FIG. 8, the time until the air-fuel ratio of the downstream HC adsorbent catalyst 10 inlet reaches a lean level is conspicuously reduced in comparison with the Reference example which is simply set to a fixed lean air-fuel ratio.

As a result, oxidization operations for released HC are commenced in an extremely short time after the initiation of HC release and the amount of HC released from the HC adsorbent catalyst 10 is greatly reduced.

Since the Reference example lacks the provision of a lean spike, time is necessary for saturation of the three-way catalyst 9 and during that time HC oxidization processing is not performed. Thus to this degree, increases in HC emissions are unavoidable.

When the lean spike performed immediately after initiation of HC release is completed, an air-fuel ratio with a lean level which corresponds to HC release characteristics is maintained. That is to say, during HC release, an air-fuel ratio which has a lower lean level than the lean spike is maintained. During this period, oxidization of released HC is continuously performed.

The present invention comprises two catalysts respectively disposed in the upstream and downstream positions which act as HC adsorbent catalysts. However when the downstream HC adsorbent catalyst 11 commences HC release, remaining oxygen storage capacity of the entire upstream catalyst, that is to say, the total of the three-way catalyst 9 and the upstream HC adsorbent catalyst 10 is calculated. The lean air-fuel level of the lean spike and the continuous time are set on this basis.

As a result, even if oxygen is stored in the two upstream catalysts with the initiation of lean control of the air-fuel ratio, the air-fuel ratio is varied to a lean degree in order to saturate the catalysts in a short time. Thus oxygen reaches the downstream HC adsorbent catalyst 11 in an extremely short time in the same way as above and HC oxidation is commenced. Therefore it is possible to conspicuously reduce HC emissions when released downstream.

The same material, as above HC adsorbent catalyst, for example zeolite, may be applied as an HC adsorbent on the upstream of a catalyst carrier and a catalyst may be applied downstream of the same. Otherwise a mixture of an HC adsorbent and a catalyst may be applied on the catalyst carrier or a catalyst on the surface layer of the catalyst carrier and an HC adsorbent on a lower layer.

The entire contents of Japanese Patent Application P10-167249 (filed Jun. 15, 1998) is incorporated herein by reference. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. An emission control device for an engine comprising:
   a catalyst disposed in an exhaust passage, the catalyst storing oxygen;
   a hydrocarbon adsorbent-catalyst disposed in the exhaust passage at a location downstream of the catalyst; and
   a control unit that controls an air-fuel ratio of the engine, wherein the control unit is programmed.
   to determine release of hydrocarbons from the hydrocarbon adsorbent-catalyst based on the hydrocarbon adsorbent-catalyst temperature
   to control the air-fuel ratio to a first lean air-fuel ratio when the hydrocarbon adsorbent-catalyst starts to release hydrocarbons, and
   to control an air-fuel ratio to a second lean air-fuel ratio after controlling to the first lean air-fuel ratio during hydrocarbon release by the hydrocarbon adsorbent-catalyst; the first lean air-fuel ratio being leaner than the second lean air-fuel ratio.

2. An emission control device for an engine according to claim 1, wherein the control unit is further programmed to determine the first lean air-fuel ratio and to determine a continuation time controlling to the first lean air-fuel depending on an oxygen storage capacity of the catalyst.

3. An emission control device for an engine according to claim 2, further comprising a air-fuel sensor disposed in the exhaust passage at a location downstream of the catalyst; and
   wherein the control unit is further programmed to determine a level of deterioration of the catalyst depending on an output of the air-fuel sensor and
   to calculate the oxygen storage capacity of the catalyst depending on the determined level of deterioration of the catalyst.

4. An emission control device for an engine according to claim 1, wherein the control unit is further programmed
   to determine the first lean air-fuel ratio and to determine a continuation time controlling to the first lean air-fuel ratio depending on a current oxygen storage amount of the catalyst.

5. An emission control device for an engine according to claim 4, further comprising a linear air-fuel sensor disposed in the exhaust passage at a location upstream of the catalyst; and
   control unit is further programmed
   to calculate the current oxygen storage amount of the catalyst depending on a difference between a stoichiometric air-fuel ratio and an output of the linear air-fuel ratio.

6. An emission control device for an engine according to claim 1 wherein the control unit is further programmed
   to determine the first lean air-fuel ratio and to determine a continuation time controlling to the first lean air-fuel ratio depending on the difference between an oxygen storage capacity of the catalyst and a current oxygen storage amount of the catalyst.

7. An emission control device for an engine according to claim 1 wherein the control unit is further programmed
   to reduce a lean level of the first lean air-fuel ratio according to deterioration of the catalyst.

8. An emission control device for an engine according to claim 1 wherein the control unit is further programmed
   to estimate the temperature of at least one of the catalysts depending on engine rotation speed and engine load.

9. An emission control device for an engine comprising:
   a catalyst disposed in an exhaust passage, the catalyst storing oxygen;
   a hydrocarbon adsorbent-catalyst disposed in the exhaust passage at a location downstream of the catalyst; and
   means for determining relase of hydrocarbons from the hydrocarbon adsorbent-catalyst based on the hydrocarbon adsorbent-catalyst temperature;
   means for controlling the air-fuel ratio to a first lean air-fuel ratio when the hydrocarbon adsorbent-catalyst starts to release hydrocarbons; and
   means for controlling an air-fuel ratio to a second lean air-fuel ratio after controlling to the first lean air-fuel ratio during hydrocarbon release by the hydrocarbon adsorbent-catalyst; the first lean air-fuel ratio being leaner than the second lean air-fuel ratio.

10. An emission control device for an engine comprising:
    a catalyst disposed in an exhaust passage, the catalyst storing oxygen;
    a first hydrocarbon adsorbent-catalyst disposed in the exhaust passage at a location downstream of the catalyst, the first hydrocarbon adsorbent-catalyst storing oxgen;

a second hydrocarbon adsorbent-catalyst disposed in the exhaust passage at a location downstream of the first hydrocarbon adsorbent catalyst; and a control unit that controls an air-fuel ratio of the engine, wherein the control unit is programmed to determine release of hydrocarbons from the first and second hydrocarbon adsorbent-catalyst based on the respective hydrocarbon adsorbent-catalyst temperatures.

to control the air-fuel ratio to a first lean air-fuel ratio according to remaining oxygen storage capacity of the catalyst when the first hydrocarbon adsorbent-catalyst starts to release hydrocarbons, and to control an air-fuel ratio to a second lean air-fuel ratio after controlling to the first lean air-fuel ratio during hydrocarbon release by the first hydrocarbon adsorbent-catalyst; the first lean air-fuel ratio being leaner than the second lean air-fuel ratio and to control the air-fuel ratio to a third lean air-fuel ratio according to remaining oxygen storage capacity of the catalyst and the first hydrocarbon adsorbent-catalyst when the second hydrocarbon adsorbent-catalyst starts to release hydrocarbons, and to control an air-fuel ratio to a fourth lean air-fuel ratio after controlling to the third lean air-fuel ratio during hydrocarbon release by the second hydrocarbon adsorbent-catalyst; the third lean air-fuel ratio being leaner than the fourth lean air-fuel ratio.

* * * * *